(12) United States Patent
Keller et al.

(10) Patent No.: US 8,964,961 B2
(45) Date of Patent: Feb. 24, 2015

(54) METHOD OF ROUTING A SESSION FROM A CALLING PARTY IN A SERVING COMMUNICATION NETWORK OF THE CALLING PARTY TO A CALLED PARTY

(75) Inventors: Ralf Keller, Wurselen (DE); Fredrik Lindholm, Alvsjo (SE); Gert Öster, Jarfalla (SE); Mats Ola Stille, Bromma (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 688 days.

(21) Appl. No.: 13/012,337

(22) Filed: Jan. 24, 2011

(65) Prior Publication Data

US 2012/0177193 A1    Jul. 12, 2012

(51) Int. Cl.
*H04M 5/00*    (2006.01)
*H04W 76/02*   (2009.01)
*H04W 8/08*    (2009.01)

(52) U.S. Cl.
CPC .............. *H04W 76/02* (2013.01); *H04W 8/082* (2013.01)
USPC ............ 379/265.05; 379/265.06; 379/265.08; 379/266.09

(58) Field of Classification Search
USPC ............. 379/201.01–218.02, 265.05, 265.06, 379/265.08, 266.01, 266.09
See application file for complete search history.

(56) References Cited

U.S. PATENT DOCUMENTS

| | | | | |
|---|---|---|---|---|
| 2007/0097999 | A1* | 5/2007 | Yan | 370/410 |
| 2007/0149166 | A1* | 6/2007 | Turcotte et al. | 455/404.1 |
| 2007/0195755 | A1* | 8/2007 | Li et al. | 370/352 |
| 2009/0310758 | A1* | 12/2009 | Tuohino et al. | 379/37 |

FOREIGN PATENT DOCUMENTS

| | | | |
|---|---|---|---|
| WO | 2007/072462 A2 | 6/2007 | |
| WO | WO 2007104360 A1 * | 9/2007 | |

OTHER PUBLICATIONS

Ericsson et al., "Update of Alternative 4," 3GPP TSG SA WG2 Meeting #79, TD S2-102448, May 10-14, 2010, pp. 1-6, Kyoto, Japan.
Huawei, "Dynamic Bicast in CS MGW," 3GPP TSG SA WG2 Meeting #77, TD S2-100618, Jan. 18-22, 2010, pp. 1-3, Shenzhen, China.

(Continued)

*Primary Examiner* — Duc Nguyen
*Assistant Examiner* — Yosef K Laekemariam
(74) *Attorney, Agent, or Firm* — Coats & Bennett, PLLC

(57) ABSTRACT

A method of routing a session from a calling party in a serving communication network of the calling party to a called party is described. The serving communication network of the calling party is distinct from a home communication network of the calling party. The method is executed by a session routing node in the serving communication network of the calling party. In order to optimize a session routing path of signaling data of the session, the method comprises receiving from the home communication network of the calling party a session routing request requesting routing the signaling data of the session to the called party via the serving communication network of the calling party, and routing the signaling data of the session to the called party via the serving communication network of the calling party based on the received session routing request.

29 Claims, 8 Drawing Sheets

(56) References Cited

OTHER PUBLICATIONS

3rd Generation Partnership Project, "Technical Specification Group Services and System Aspects; Single Radio Voice Call Continuity Enhancements; Stage 2 (Release 10)," 3GPP TR 23.856 v10.0.0, Sep. 2010, pp. 1-22, 3GPP, Sophia Antipolis, Valbonne, France.

Third Generation Partnership Project. "Sub Alternative 4—Media Anchor in the Serving Network." 3GPP TG SA WG2 Meeting #78, TD S2-101091, San Francisco, CA, USA, Feb. 22-26, 2010.

Third Generation Partnership Project. 3GPP TS 23.228, V10.3.1 (Jan. 2011). 3rd Generation Partnership Project; Technical Specification Group Services and Systems Aspects; IP Multimedia Subsystem (IMS); Stage 2 (Release 10). Jan. 2011.

Holmberg, C. et al., "Indication of features supported by proxy", SIPCORE Working Group, Internet-Draft, Intended status: Standards Track, Expires: Mar. 28, 2011, Sep. 24, 2010, pp. 1-6.

3rd Generation Partnership Project, "Technical Specification Group Services and System Aspects; Study on Stage 2 aspects of Optimised Service Charging and Allocation of Resources in IMS whilst Roaming (Release 11)", 3GPP TR 23.849 V0.1.0, Dec. 2010, pp. 1-8.

* cited by examiner

METHOD OF ROUTING A SESSION FROM A CALLING PARTY IN A SERVING COMMUNICATION NETWORK OF THE CALLING PARTY TO A CALLED PARTY

RELATED APPLICATIONS

This application claims priority to International Patent Application Number PCT/EP2011/050134, filed 6 Jan. 2011 and incorporated by reference herein in its entirety.

TECHNICAL FIELD

The invention relates to telecommunications, and in particular to methods of, session routing nodes for, and a communication system for routing a session from a calling party in a serving communication network of the calling party to a called party, a program element, and a computer-readable medium.

BACKGROUND

Introduction of the IP multimedia subsystem (IMS) into mobile networks based on 3rd Generation Partnership Project (3GPP) offers the possibility to route a session from a calling party to a called party using Internet Protocol (IP) connectivity. Assuming the calling party roaming from its home communication network to a serving or visited communication network, signaling data and media data of an originating session of the calling party are routed from the serving communication network of the calling party to the home communication network of the calling party and thereupon further to the serving communication network in which the called party resides.

Recently, efforts in optimizing routing the session from a calling party located in its serving communication network to a called party has resulted in routing the media data of a session from the calling party to the called party directly via the serving communication network of the calling party. Such media routing optimization is known for "local break out" calls for which the media data of the call are not forced back to the home communication network of the calling party but is routed to the called party via the serving communication network of the calling party. Further, media routing optimization may be enabled by Optimized Media Routing (OMR) aiming at routing the media data of a session directly via the serving communication network of a calling party without passing the home communication network of the calling party.

Referring to FIG. 1, an IMS based communication system 100 for routing an originated voice session from calling party 102 located in its serving or visited communication network 104 to a called party is illustrated. A session path of signaling data 106 of the session runs from the serving communication network 104 of the calling party 102 to the home communication network 108 of the calling party 102 and then, for example, to a home communication network of the terminating called party. In this embodiment, the serving communication network 104 of the calling party 102 corresponds to the Visited Public Land Mobile Network (VPLMN), and the home communication network 108 or the calling party 102 corresponds to the Home Public Land Mobile Network (HPLMN). A session path of media data 110 of the session runs to the called party via the serving communication network 104 of the calling party 102 and accordingly bypasses media routing nodes of the home communication network 108 of the calling party 102. In case the called party has also roamed to its serving or visited communication network, the signaling data 106 and media data 110 of the session are routed from the home communication network of the calling party to the serving communication network of the called party.

In the serving communication network 104, the signaling data 106 pass firstly a Serving and Packet Data Network (PDN) Gateway (S&P GW) 112, then a Proxy-Call Session Control Function (P-CSCF) 114, and an Interconnection Boarder Control Function (IBCF) 116. Further, in the home communication network 108, the signaling data 106 of the session pass firstly an IBCF 118, then a Serving-Call Session Control Function (S-CSCF) 120, a Service Centralization and Continuity Application Server (SCC AS) 122, and then a network interconnection node 124 or 125. The interconnection node 124 comprises an IBCF 126 configured for routing signaling data. The interconnection node 125 is configured as a Breakout Gateway Control Function (BGCF) 127 configured for routing a session to a Mobile Switching Center-Server (MSC-S) or a Media Gateway Control Function (MGCF) of a core network of the home communication network 108 for breaking out the session from the IMS based home communication network 508 to a circuit switched (CS) communication network. The MSC-S and the MGCF are denoted together by a reference numeral 128. A determination of a selection of one of the interconnection nodes 124 and 126 is executed by the S-CSCF 120 of the home communication network 108 of the calling party 102.

The media data 110 of the session are routed via the serving communication network 104 of the calling party 102 passing the S&P GW 112, and an Access Gateway (AGW) or an Access Transfer Gateway (ATGW), both being denoted by a reference numeral 130. A decision whether to route the media data 110 via the serving communication network 104 is also executed in the home communication network 108.

The session routing path of the signaling data 106 is enabled by locally breaking out the session. Here, a location of the PDN Gateway 112 in the serving communication network 104 of the calling party 102 determines to execute a local breakout of the call.

For completeness, a visited Policy and Charging Rules Function (vPCRF) 132 is located in the serving communication network 102, and a home Policy and Charging Rules Function (hPCRF) 134, an Interrogation Call Session Control Function (I-CSCF) 136, a Home Subscriber Server (HSS) 138, an Electronic Numbering Function ENUM 140, a Media Gateway (M-MGW) 142, and a Translation Gateway TrGW 130 in the home communication network 108.

Charging or payment of the session is based on the session routing path of the signaling data 106.

Accordingly, routing an originating session of a calling party having roamed to its visited communication network to the called party via the IMS based home communication network of the calling party may be particularly complex and network capacity consuming, since the signaling data and the media data of the session may not be routed along with one another, and respective routing decisions may be executed in the home communication network. Further, from a session charging perspective of view, mobile operators operating a serving communication network of the calling party may not substantially participate in charging an originating session of a calling party.

SUMMARY

In one aspect, the present invention provides an improved routing of signaling data of a session to be routed from a calling party residing in its visited communication network to a called party.

Embodiments herein thus include methods of, a session routing node in a serving communication network of the calling party for, a session routing in a home communication network of the calling party for, and a communication system for routing a session from a calling party in a serving communication network of the calling party to a called party, a program element, and a computer-readable medium according to the independent claims. Further embodiments of the methods, the session routing nodes, the communication system, the program element, and the computer-readable medium are defined in the dependent claims.

According to an exemplary aspect of the invention, a method of routing a session from a calling party in a serving communication network of the calling party to a called party is provided. The serving communication network of the calling party is distinct from a home communication network of the calling party. The method is executed by a session routing node in the serving communication network of the calling party. The method comprises receiving from the home communication network of the calling party a session routing request requesting routing signaling data of the session to the called party via the serving communication network of the calling party, and routing the signaling data of the session to the called party via the serving communication network of the calling party based on the received session routing request.

According to another exemplary aspect of the invention, a method of routing a session from a calling party in a serving communication network of the calling party to a called party is provided. The serving communication network of the calling party is distinct from a home communication network of the calling party. The method is executed by a session routing node in the home communication network of the calling party. The method comprises receiving from the serving communication network of the calling party a session routing request requesting routing signaling data of the session to the called party via the serving communication network of the calling party, determining whether the signaling data of the session are to be routed via the serving communication network of the calling party, and routing the signaling data of the session to the serving communication network of the calling party based on a result of the determination.

According to another exemplary aspect of the invention, a method of routing a session from a calling party in a serving communication network of the calling party to a called party is provided. The serving communication network of the calling party is distinct from a home communication network of the calling party. The method comprises transferring a session routing request between the home communication network of the calling party and the serving communication network of the calling party requesting routing signaling data of the session to the called party via the serving communication network of the calling party, and routing the signaling data of the session to the called party via the serving communication network of the calling party based on the transferred session routing request.

According to another exemplary aspect of the invention, a session routing node in a serving communication network of a calling party configured for routing a session from the calling party in a serving communication network of the calling party to a called party is provided. The serving communication network of the calling party is distinct from a home communication network of the calling party. The session routing node comprises a receiving unit configured for receiving a session routing request from the home communication network of the calling party requesting routing signaling data of the session to the called party via the serving communication network of the calling party, and a routing unit configured for routing the signaling data of the session to the called party via the serving communication network of the calling party based on the received session routing request.

According to another exemplary aspect of the invention, a session routing node in a home communication network of a calling party configured for routing a session from the calling party in the serving communication network of the calling party to a called party is provided. The serving communication network of the calling party is distinct from a home communication network of the calling party. The session routing node comprises a receiving unit configured for receiving from the serving communication network of the calling party a session routing request requesting routing signaling data of the session to the called party via the serving communication network of the calling party, a determining unit configured for determining whether the signaling data of the session are to be routed via the serving communication network of the calling party, and a routing unit configured for routing the signaling data of the session to the serving communication network of the calling party based on a result of the determination.

According to another exemplary aspect of the invention, a communication system for routing a session from a calling party in a serving communication network of the calling party to a called party is provided. The serving communication network of the calling party is distinct from a home communication network of the calling party. The communication system comprises a session routing node in the serving communication network of the calling party as described above and a session routing node in the home communication network as described above.

According to another exemplary aspect of the invention, a program element is provided. The program element, when being executed by a processor, is configured to carry out or control a method of routing a session from a calling party in a serving communication network of the calling party to a called party as defined above.

According to another exemplary aspect of the invention, a computer-readable medium is provided. In the computer-readable medium, a computer program for routing a session of a calling party in a serving communication network of the calling party to a called party is stored. The computer program, when being executed by a processor, is configured to carry out or control a method of routing a session from a calling party in a serving communication network of the calling party to a called party as described above.

In particular, abbreviations and/or terms as defined in the Background section may also apply to a description of the invention.

In the context of this application, the terms "calling party" and "called party" may particularly denote a subscriber or a user who may use a user equipment or a terminal to subscribe in a service, particularly in IMS, for running a session. In particular, an user equipment may be a telecommunications device such as a mobile phone which may be used during a session establishment or an ongoing session with further telecommunications devices or entities.

The term "home communication network" may particularly denote a network to which a party of a (particularly to be established or ongoing) session may perform a registration. In particular, the home communication network may keep record of subscriber data of the called party. In particular, the home communication network may comprise an access network and a core network, and may be particularly based on IMS.

The term "serving communication network" may particularly denote a visited network to which a party of a (particularly to be established or ongoing) session may roam. In particular, the serving communication network of the party may be identical to a home communication network of the party in a case in which the party may not be roaming. In particular, the serving communication network may comprise an access network and a core network, and may be particularly based on IMS.

The term "signaling data of a session" may particularly denote data related to controlling the session. In particular, the signaling data may be sent in a session routing request (for example, a SIP-INVITE message) when establishing a session or may be sent during an ongoing session, particularly in order to modify a transfer of media (payload) data. For example, a session may have been established for transferring voice data to a called party. However, during the ongoing voice session signaling data related to requesting adding video data to the ongoing media data transfer of the session may be transferred along the session routing path of the signaling data associated with the prior establishment of the session.

The term "routing signaling data of a session via the serving communication network" may particularly denote a transfer of the signaling data along at least a portion of the serving communication network. In particular, a transfer of the signaling data may be within the serving communication network (particularly by the transfer entering the serving communication network and the transfer terminating in the serving communication network) or may pass through the serving communication network.

BRIEF DESCRIPTION OF THE DRAWINGS

The invention will be described in more detail hereinafter with reference to examples of embodiment, but to which the invention is not limited.

DETAILED DESCRIPTION

The illustrations in the accompanying drawings are schematic. It is noted that in different figures, similar or identical elements are provided with the same reference signs or with reference signs which are different from the corresponding reference signs only within the first digit.

Figure 2:
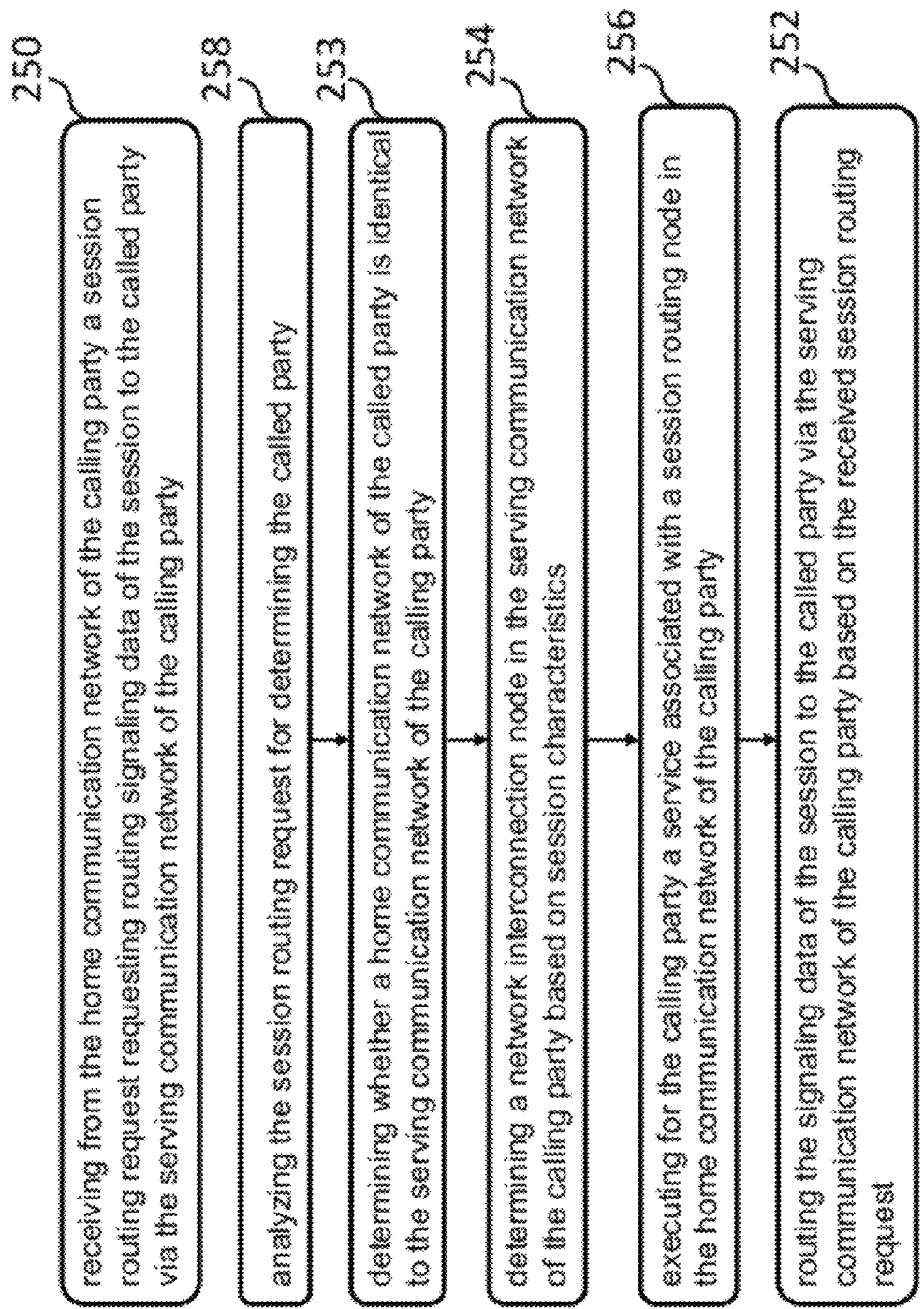
FIGS. 2 to 4 illustrate flow diagrams illustrating methods of routing a session from a calling party in a serving communication network of the calling party to a called party according to exemplary embodiments of the invention.

Referring to FIG. 2 a method of routing a session from a calling party in a serving communication network of the calling party to a called party according to an exemplary embodiment of the invention will be explained. The serving communication network of the calling party is distinct from a home communication network of the calling party. The method is executed by a session routing node in the serving communication network of the calling party. The method comprises a step 250 of receiving from the home communication network of the calling party a session routing request requesting routing signaling data of the session to the called party via the serving communication network of the calling party, and a step 252 of routing the signaling data of the session to the called party via the serving communication network of the calling party based on the received session routing request.

In particular, a calling party may be roaming from its home communication network to its serving or visited communication network. The calling party may initiate to establish an originating session to a called party. In order to establish the session, a respective session routing request may be transferred between the respective session routing nodes of the home communication network and the serving communication network of the calling party, and may request routing the signaling data of the session from the serving communication network of the calling party to the home communication network of the calling party, thereupon back to the serving communication network of the calling party and further to the called party. After having established the session, the signaling data of the session may be routed from the serving communication network of the calling party to the home communication network of the calling party, thereupon back to the serving communication network of the calling party and further to the called party based on the session routing request. Here, the signaling data of the session may pass via the home communication network of the calling party. In particular, a session routing path of signaling data of the established session may be identical to a session routing path of session routing requests during the establishment of the session.

In particular, optimization of routing signaling data of a session may be enabled in that the session may be routed directly between the serving communication network of the calling party and a respective communication network of the called party, since the signaling data of the session may be routed at least partly in parallel with the media data. Further, routing decisions may be also executed in the serving communication network, thereby releasing capacity of the home communication network of the calling party.

In particular, roaming agreements already existing for the serving communication network of the calling party may be usable during an establishment of session and an ongoing session, thereby rendering modifications of the roaming agreements based on the new routing path of the signaling data being not necessary.

In particular, already existing payment models may be applied for charging the session from the calling party to the called party, since the session may be to be routed from the serving communication network of the calling party to the home communication network of the calling party and then back to the serving communication network of the calling party. In particular, an operator of the serving communication network of the calling party may participate in the charging of the session to a larger extent compared to a prior art session routing.

In particular, routing related services during the session establishment or during the routing of the session may be executed by the serving communication system, since the signaling data of the session may be routed via the serving communication network towards the called party. In particular, address information (for example, directory telephone numbers such as 118-xxx-numbers) of the serving communication network of the calling party which may be local in the serving communication network of the calling party and which may be not reachable by the calling party from its home communication network may be usable by the calling party for the session.

In particular, in a case in which the home communication network may be based on IMS and the calling party may initiate a session to the called party, circuit switched roaming agreements of the serving communication system may be reusable for the session (establishment). In particular, a cascade payment model known from Global System for Mobile Communications (GSM) may be also applicable to an IMS voice session, since signaling data of such a voice session may be routed to the called party via the home communication network and, thereupon, via the serving communication network of the calling party.

Next, further exemplary embodiments of the method will be explained. However, these embodiments also apply to the respective another methods, the respective session routing nodes, the respective communication system, the respective computer program, and the respective computer-readable medium as described in the "Summary" section and the "Detailed description" section.

The method may further comprise a step 253 of determining whether a home communication network of the called party may be identical to the serving communication network of the calling party, wherein the routing may comprise routing the signaling data of the session to the called party within the serving communication network of the calling party particularly via a session routing node (particularly a Interrogation-Call Session Control Function (I-CSCF) and/or a Serving-Call Session Control Function (S-CSCF)) of the serving communication network of the calling party, if the home communication network of the called party may be identical to the serving communication network of the calling party (particularly the called party may be residing in the serving communication network of the calling party). Here, the session routing node(s) of the serving communication network of the calling party may be accordingly selected based on a result of the determination. Hence, the session may be terminated in the serving communication network of the calling party. In particular, if the determination may be not in the affirmative, (i.e. the home communication network of the called party may be not identical to the serving communication network of the calling party, particularly the called party may be not residing in the serving communication network of the calling party), the session may be routed to the communication network of the called party via the serving communication network of the calling party. Hence, the session may be routed through the serving communication network of the calling party. Thus, an optimal routing of the signaling data of the session may be enabled.

The method may further comprise a step 254 of determining a network interconnection node in the serving communication network of the calling party based on session characteristics, and (particularly selecting the network interconnection node based on a result of the determination), and the routing may comprise routing the signaling data of the session via the network interconnection node in the serving communication network of the calling party based on a result of the determination. The term "session characteristics" may particularly denote characteristics of the session related to a kind of transferred data (for example, voice or video) and/or related to the called party (for example, the called party being addressable in IMS). In particular, the term "network interconnection node" may particularly denote a node or an entity of a communication network for interconnecting the communication network to another communication network particularly with respect to signaling data and/or media data. In particular, an interconnection node may comprise a node configured for routing signaling data (for example, an IBCF, a MSC-S or a MGCF) and/or a node configured for routing media data (for example, a M-MGW, a TrGW). Thus, an appropriate network interconnection node may be selected by the session routing node in the serving communication network of the calling party, in order to route the session to the called party in an optimal way.

Figure 1:
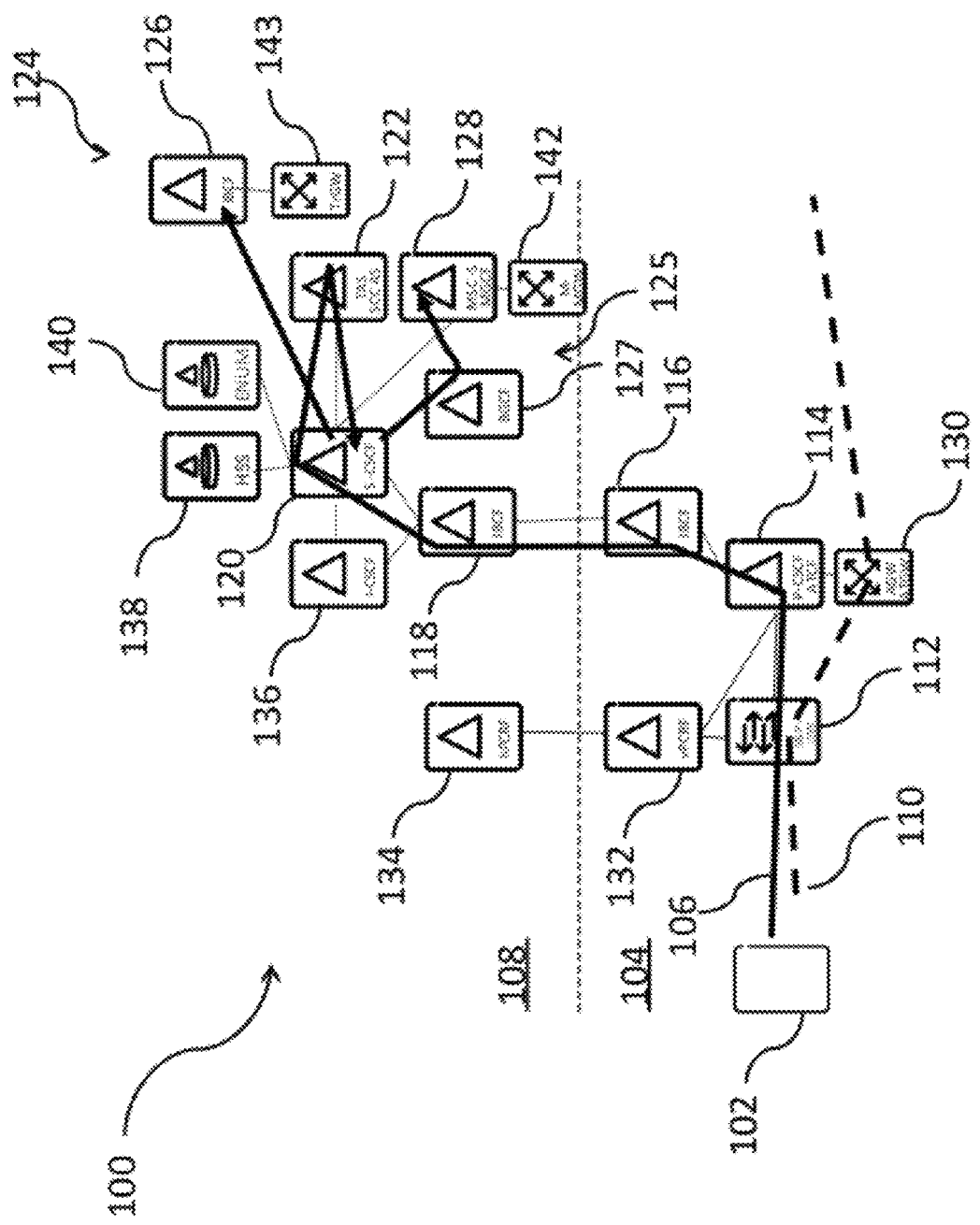
FIG. 1 illustrates a block diagram illustrating a communications architecture during an originating session from a calling party in its serving communication network to a called party.

In particular, an IBCF may be configured for routing the signaling data to another IP or IMS based communication network. In particular, a MGCF may be configured for routing the signaling data to a circuit switched (CS) communication network. In particular, a BGCF may be configured for selecting an IBCF (particularly in a case in which the called party may be addressed by a phone number) or an MGCF for the routing of the signaling data. In particular, when breaking out a call or a session to a CS communication network, the BGCF may select the MSC-S or MGCF and may route the signaling data to the called party via the MSC-S or MGCF. In this context, the term "break out a session" may particularly denote a routing of the signaling data to a CS communication network. In particular, a break out of a session may not comprise and may be distinct from a "local breakout" as described in conjunction with FIG. 1.

In particular, the determination may be based on a lookup of routing information identifying the calling party. For example, such lookups may be executed by the session routing node of the serving communication network and may comprise ENUM and/or Number Portability (NP) lookup(s), as may be executed by a session routing node (for example, a S-CSCF) in the home communication network of the calling party. This measure may allow for acquiring information about a destination network of the session, particularly about the home communication network of the called party.

The session may comprise media data, and the routing may comprise routing the media data to the called party via the network interconnection node (or a node controlled by the network interconnection node). Accordingly, network capacities may be saved during the routing of the session, since the signaling data and the media data of the session are at least partly routed parallel to one another.

In particular, the media data of the session may be routed to the called party directly via the serving communication network of the calling party without passing through the home communication network of the calling party based on the session routing request.

The method may further comprise a step 256 of executing for the calling party a (particularly local) service associated with a session routing node in the home communication network of the calling party. The term "service associated with a session routing node in the home communication network of the calling party" may particularly denote a local service which may be generic for all parties subscribing to the home communication network of the calling party and thus being associated with one single operator. In particular, such a service may comprise at least one of tone insertion (for example, a waiting music), an announcement insertion (for example, a dialing tone), a data transcoding, and conferencing features. In particular, the home communication network may support 3GGP OSCAR. In particular, the service may be executed for the calling party during a session establishment and/or an ongoing session. In particular, the availability and/or the execution of the service may be based on roaming agreements (for example, a service level agreement (SLA)) between the home communication network and the serving communication network of the calling party. Thus, execution of a service conventionally executed by a session routing node in the home communication network of the calling party may be delegated to the session routing node in the serving communication network of the calling party.

The session routing request may comprise routing information identifying the called party, and the method may further comprise a step 258 of analyzing the session routing request for determining the called party (particularly for the determination whether the signaling data may be to be routed to the called party via the serving communication network of the calling party and/or the determination of the network interconnection node as described above), and the routing may comprise routing the signaling data of the session to the called party based on a result of the analysis. In particular, the routing information may comprise a name and/or an address of the called party. In particular, the routing information may comprise at least one of a Uniform Resource Identifier (URI) (particularly of a message header, for example, a P-header), feature information of a message header, and identification information of the called party of a message header (for example, a P-called party ID-header). In particular, the header may be identical to the "path header" of a SIP-INVITE message as defined by 3GPP or may be distinct from the path header and may correspond to a newly defined header. In particular, the feature information may comprise a media feature tag being included in a message header, and may define a future routing destination of the message. In particular, the header comprising the URI, the feature information and/or the identification of the called party may be part of an already existing header or may correspond to a newly defined field of the header. In particular, the latter embodiments of the routing information may define a future destination for the routing of information or a message. In particular, the session routing node in the serving communication network may derive the information about a terminating recipient of the session routing request from the session routing request, and may include the information about the called party in another session routing request further sent to the called party for routing purposes. In particular, the received session routing request and the another sent session routing request may be identical to one another, thereby the session routing node simply modifying the routing information of the received session routing request.

In particular, a sequence of the steps 252-258 may be interchangeable with respect to one another. In particular, at least two of the steps 250-258 may be simultaneously executed.

Figure 3:
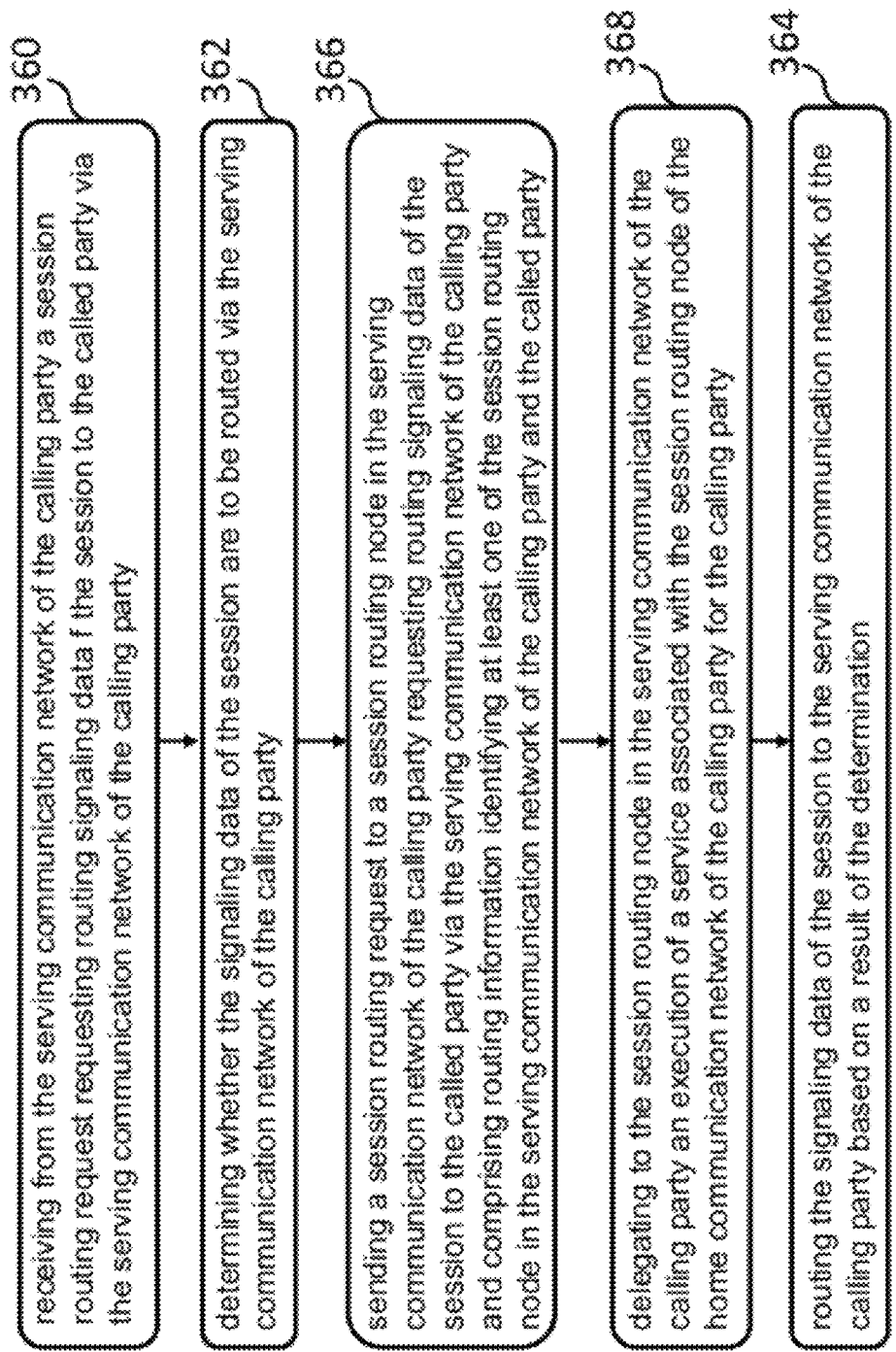

Referring to FIG. 3, a method of routing a session from a calling party in a serving communication network of the calling party to a called party will be explained. The serving communication network of the calling party is distinct from a home communication network of the calling party. The method is executed by a session routing node in the home communication network of the calling party. The method comprises a step of 360 of receiving from the serving communication network of the calling party a session routing request requesting routing signaling data of the session to the called party via the serving communication network of the calling party, a step 362 of determining whether the signaling data of the session are to be routed via the serving communication network of the calling party, and a step of 364 of routing the signaling data of the session to the serving communication network of the calling party based on a result of the determination.

Next, further exemplary embodiments of the method will be explained. However, these embodiments also apply to the respective another methods, the respective session routing nodes, the respective communication system, the respective computer program, and the respective computer-readable medium as described in the "Summary" section and the "Detailed description" section.

The determining may comprise determining whether the session routing request may comprise routing information identifying the session routing node in the serving communication network of the calling party, and the routing may comprise routing the signaling data of the session to the serving communication network of the calling party if the session routing request may comprise the routing information. In particular, in a case in which the determination may be not in the affirmative, the session routing node in the home communication network of the calling party may ignore the routing information included in the session routing request, and may interpret the routing information to be directed to another nodes in the communication network, and the signaling data of the session may be routed via the home communication network of the calling party to the called party. In particular, the method may stop. In particular, the session routing node in the home communication network of the calling party may examine whether the received session routing request may comprise routing information identifying the session routing node in the serving communication network of the calling party, in order to enable the session routing request and the signaling data of the session to be routed back to the serving communication network of the calling party. Thus, the determining may be facilitated, since a very simple but effective determination rule whether to route the signaling data of the session to the serving communication network of the calling party may be provided.

In particular, the session routing node in the home communication network of the calling party may be enabled to support routing signaling data of a session to the serving communication network of the calling party and may be thus enabled for the above mentioned determining.

The routing information may comprise at least one of a Uniform Resource Identifier (URI) (particularly of a message header), and feature information of a message header. In particular, the routing information may correspond to the routing information received by the session routing node in the serving communication network of the calling party as described above. Thus, conventionally defined address information may be employed for the routing information, thereby facilitating the implementation of the method in already existing communication systems.

The determining may comprise determining whether the session routing request may be in accordance with an available policy of the home communication network of the calling party, and the routing may comprise routing the signaling data of the session to the serving communication network of the calling party if the session routing request may be in accordance with the available policy. In particular, the available policy may be defined by an operator of the home communication network. In particular, the available policy may relate to the home communication network of the calling party allowing for receiving session routing requests and/or signaling data of a session from a particular communication network and/or for sending session request and/or routing signaling data of a session to the particular communication network. In particular, if the determination may be not in the affirmative, the signaling data of the session may be routed via the home communication network to the called party, and the method may stop. Thus, already available policies of the home communication network of the calling party may not have to be changed during execution of the method, thereby avoiding elaborate modifications of routing definitions of the home communication network of the calling party during the execution of the method.

The determining may be based on an address of the called party. In particular, the determining may comprise determining whether a country in which the called party may reside may be distinct from a country in which the calling party may reside, and the routing may comprise routing the signaling data of the session to the serving communication network of the calling party if the country of the called party may be distinct from the country of the calling party. In particular, in a case in which the country of the called party may be identical to the country of the calling party (i.e. the determination may be not in the affirmative), the session may be directly routed to the called party via the home communication network of the calling party, and the method may stop. In particular, the determining may comprise determining whether a home communication network of the called party may be distinct from the home communication network of the calling party, and the routing may comprise routing the signaling data of the session to the serving communication network of the calling party if the home communication network of the called party may be distinct from the home communication network of the calling party. In particular, in a case in which the home communication network of the called party may be not distinct and thus may be identical to the home communication network of the calling party (i.e. the determination may be not in the affirmative), the session may be directly routed to the called party via the home communication network of the calling party, and the method may stop. In particular, the determining may be based on analyzing routing information, for example a telephone member, of the called party. Thus, owing on the determining based on the address of the called party, an improved session routing path may be used for routing the signaling data of the session to the called party, since a shortest possible session routing path may be selected for the routing of the signaling data of the session, thereby saving network capacities during the routing of the session.

The determining may comprise determining whether media routing nodes between the session routing node in the home communication network of the calling party (particularly a point of a determination of a session routing path of the media data) and the serving communication network of the calling party may be allowed to be bypassed when routing the session, and the routing may comprise routing the signaling data of the session to the serving communication network of the calling party if the media routing nodes between the session routing node in the home communication network of the calling party and the serving communication network of the calling party may be allowed to be bypassed when routing the session. In particular, in a case in which the determining may be not in the affirmative, the signaling data of the session may be routed to the called party via the home communication network of the calling party, and the method may stop. Optionally, the media data of the session may be also routed along a session routing path of the signaling data of the session. Thus, the session routing node in the home communication network of the calling party may enable to route media data of the session directly via the serving communication network of the calling party, in order to improve a session routing path of the media data. In particular, the home and serving communication network of the calling party may support Optimized Media Routing (OMR).

The determining may be based on a requested communication service associated with the session. The term "communication service" may particularly denote a kind of the media data to be transferred along the session (particularly voice data, video data, media data etc). In particular, the determining may comprise determining the kind of the communication service requested for the session, determining whether the requested communication service may be allowed to be routed to the called party via the serving communication network of the calling party, and the routing may comprise routing the signaling data of the session to the called party via the serving communication network of the calling party based on a result of the determination, particularly if the requested communication service may be allowed to be routed to the called party via the serving communication network of the calling party. In particular, in a case in which the determination may not be in the affirmative, i.e. the requested service may not be allowed to be routed via the serving communication network of the calling party, the signaling data may be routed to the called party via the home communication network of the calling party, and the method may stop. Thus, the session routing node in the home communication network may discriminate between sessions based on the different services requested along the session, in order to optimize the session routing path of the session. In particular, a voice session may be allowed to be routed back to the serving communication network of the calling party, whereas a messaging session may not be allowed to be routed back to the serving communication network but may be routed to the called party via the home communication network of the calling party.

The method may further comprise a step 366 of sending a session routing request to a session routing node in the serving communication network of the calling party requesting routing the session to the called party via the serving communication network of the calling party and comprising routing information identifying at least one of the session routing node in the serving communication network of the calling party and the called party. In particular, the routing information may be similar to the routing information defined above and may comprise at least one of the Uniform Resource Identifier (URI) (particularly of a message header), a feature information of a message header, and a called party identification of the message header as explained above. In particular, the session routing node of the home communication network of the calling party may modify the routing information received in the session routing request from the session routing node in the serving communication network of the calling party and may forward the same session routing request or may define respective routing information identifying the calling party to be sent in another session routing request.

The method may further comprise a step 368 of delegating to the session routing node in the serving communication network of the calling party an execution of a service associated with the session routing node of the home communication network of the calling party for the calling party. This measure may allow for distributing a consumption of network capacities during the establishment and/or the routing of the session, and may enable the session routing node of the serving communication network of the calling party to accordingly participate when charging the session between the calling party and the called party.

In particular, a sequence of the determining steps 362 may be interchangeable with respect to one another. In particular, a sequence of the steps 362, 364, 366, 368 may be interchangeable with respect to one another. In particular, at least two of the steps 360-368 may be simultaneously executed.

In the following, a method of routing a session from a calling party in a serving communication network of the calling party to a called party will be explained. The serving communication network of the calling party is distinct from a home communication network of the calling party. The method is executed by another session routing node in the serving communication network. The method comprises sending to (particularly the session routing node in) the home communication network a session routing request requesting routing signaling data of the session to the called party via the serving communication network of the calling party, and routing the signaling data of the session to the home communication network of the calling party.

In particular, the session routing request may comprise routing information identifying the session routing node in the serving communication network via which the session may to be routed. In particular, the routing information may comprise at least one of a Uniform Resource Identifier (URI) (particularly of a message header), feature information of a message header, and a called party identification of a message header as explained above.

Figure 4:
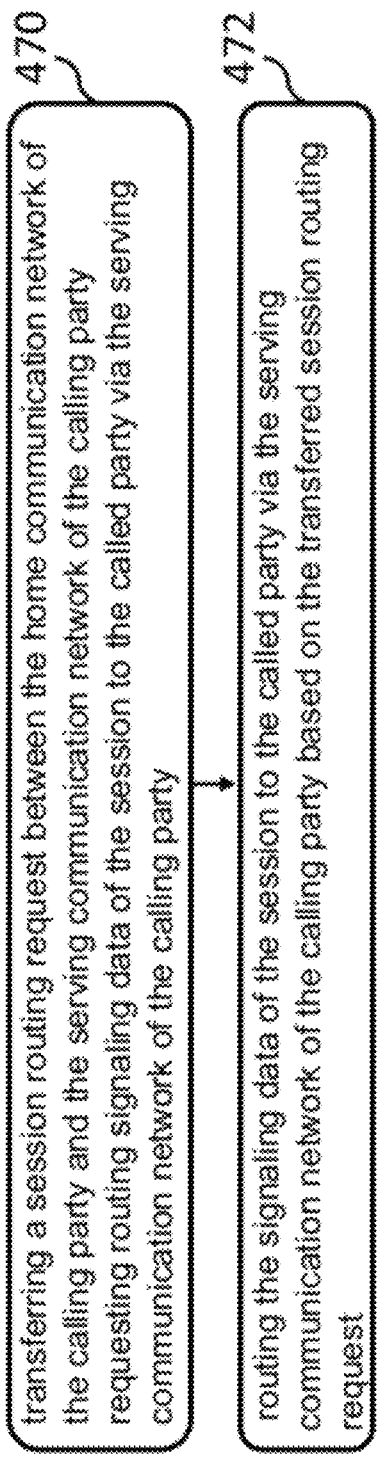

Referring to FIG. 4, a method of routing a session from a calling party in a serving communication network of the calling party to a called party will be explained. The serving communication network of the calling party is distinct from a home communication network of the calling party. The method comprises a step 470 of transferring a session routing request between the home communication network of the calling party and the serving communication network of the calling party requesting routing signaling data of the session to the called party via the serving communication network of the calling party, and a step 472 of routing the signaling data of the session to the called party via the serving communication network of the calling party based on the transferred session routing request. The term "transferring a session routing request" may particularly denote receiving and/or sending the session routing request.

Next, further exemplary embodiments of the method will be explained. However, these embodiments also apply to the respective another methods, the respective session routing nodes, the respective communication system, the respective computer program, and the respective computer-readable medium as described in the "Summary" section and the "Detailed description" section.

In particular, a communication in the serving communication network of the calling party and the home communication network of the calling party may be based on a Session Initiation Protocol (SIP). In particular, respective routing information may be included in a SIP-INVITE message sent between the respective session routing nodes.

Figure 5:
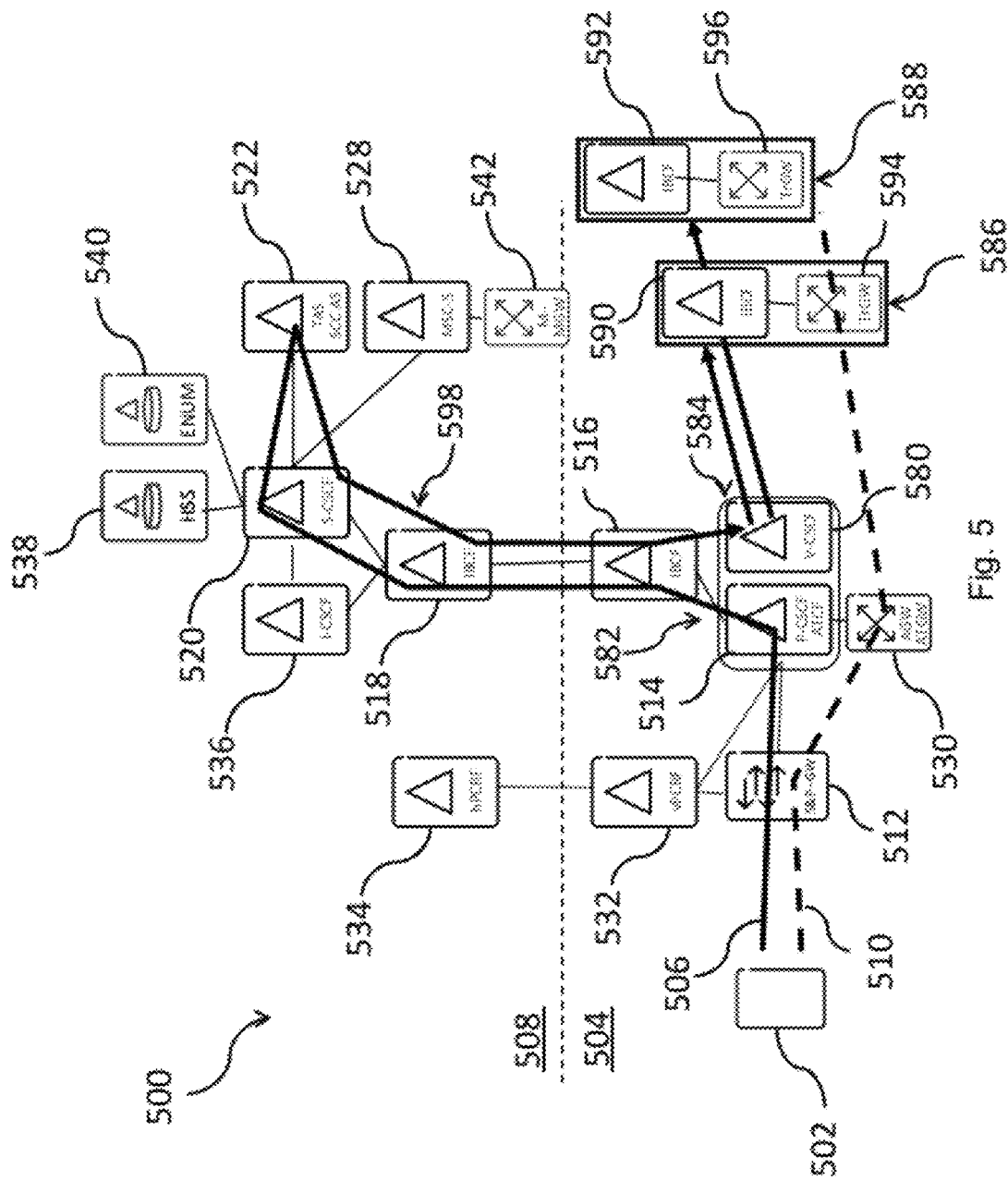
FIG. 5 illustrates a block diagram illustrating a communication architecture in accordance with a method of routing a session from a calling party in a serving communication network of the calling party to a called party according to another exemplary embodiment of the invention.
Figure 6:
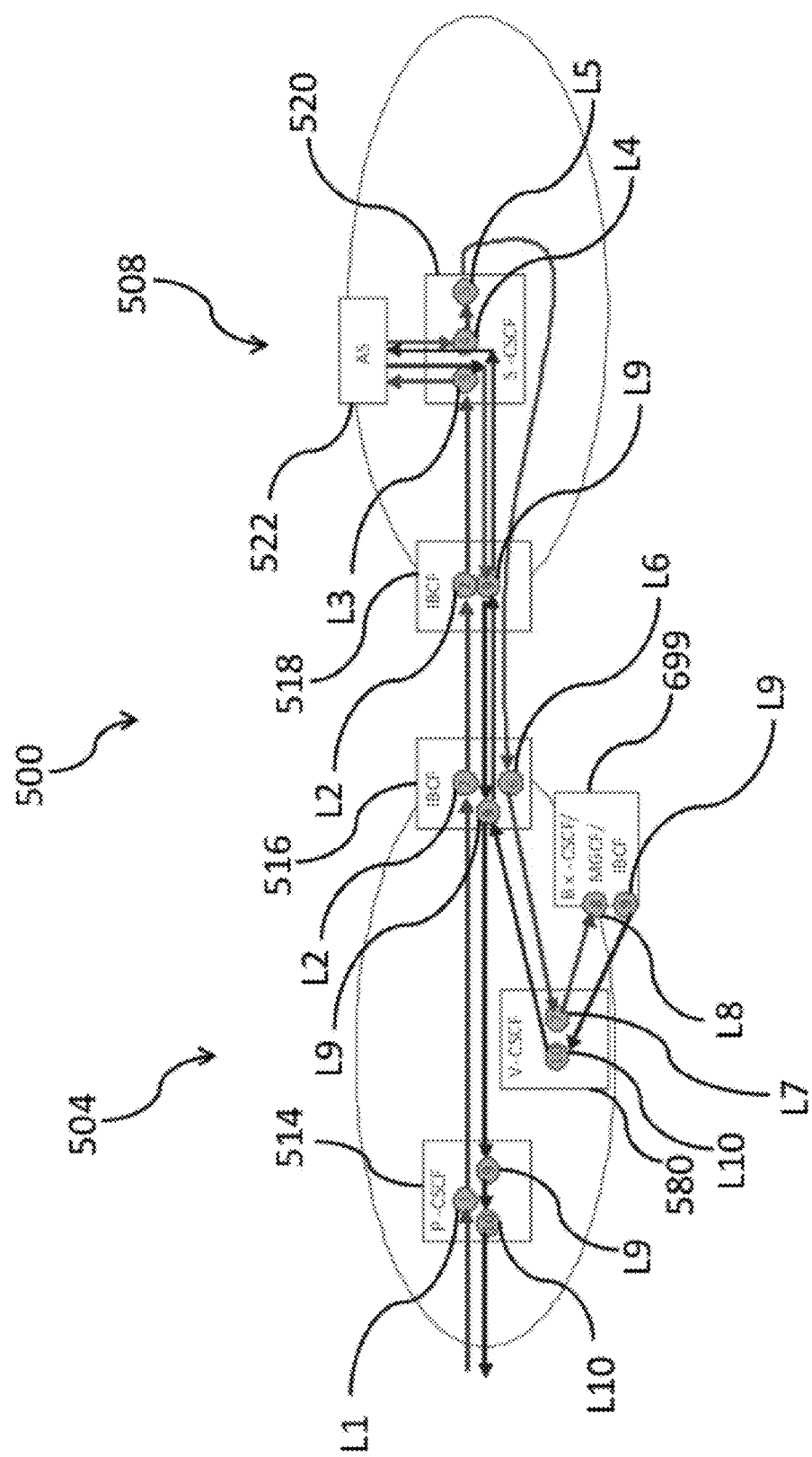
FIG. 6 illustrates a block diagram illustrating a portion of the communication architecture of FIG. 5.

Referring to FIGS. 5 and 6, a communication system 500 according to an exemplary embodiment is illustrated. The communication system 500 is identical to the communication system 100 illustrated in FIG. 1, however, a serving communication network 504 comprises a Visited-Call Session Control Function (V-CSCF) 580 co-located with a P-CSCF/ATCF 514. The P-CSCF 514 and the V-CSCF 580 form session routing nodes 582, 584 of the serving communication network 504.

Further, the serving communication network 504 comprises two network interconnection nodes 586, 588 configured for providing an interconnection to a serving communication network of a called party. Each of the interconnection nodes 586, 588 comprise an IBCF 590, 592 configured for routing signaling data, and a TrGW 594, 596 configured for routing media data. The interconnection node 586 is configured for routing packet switched media data 510, and the interconnection node 588 is configured for routing circuit switched voice calls. The serving communication network 504 may further comprise a network interconnection node configured as a BCGF configured for selecting the IBCF 590, 592, a MCS-S or a MGCF of the serving communication network 504 for the routing of the signaling data. In particular, in case of a break out of the session to a CS communication network, the BCGF may select the MSC-S or the MGCF.

The S-CSCF 520 of the home communication network 508 represents a session routing node 598 of the home communication network 508.

In the following, a method of routing a session of a calling party in a serving communication system of the calling party to a called party according to an exemplary embodiment of the invention will be explained with reference to FIGS. 5 and 6.

The calling party 502 initiates a setup of a session to the called party either located in its home communication network or in its serving communication network (in case the called party has roamed). To this end, the calling party 502 sends a SIP-INVITE message comprising signaling data 506 towards the P-CSCF 514 via the S/P-GW 512. Accordingly, the P-CSCF 514 forwards the SIP-INVITE message towards the S-CSCF 520 in the home communication network 508 via IBCFs 516, 518. The S-CSCF 520 sends a respective request to the TAS/SCC AS 522 for invoking IMS applications, and, upon receiving a response, sends a respective SIP-INVITE message to the V-CSCF 584 via the IBCFs 518, 516. Thereupon, the V-CSCF 580 determines whether the home communication network of the called party is identical to the serving communication network 504 of the calling party 502, and optionally afterwards determines a respective interconnection node 586, 588 in the serving communication network 504 based on characteristics of the session to be established and selects the determined interconnection node 586, 588. Thereupon, a respective SIP-INVITE message is sent one of the interconnection nodes 586, 588. The latter sending is indicated in FIG. 5 by parallel arrows for both interconnection nodes 586, 588.

After having established the session to the called party, a session routing path of the signaling data 506 of the session is identical to an information exchange during the setup of the session as described above and is indicated by a solid line in FIG. 5. Signaling data 506 of the established session which are related to requesting a modification of the media data 510 to be transferred to the called party are also routed along the session routing path of the signaling data 506 associated with the session establishment. A session path of the media data 510 of the session is established in the serving communication network 504 from the calling party 502 via the S/P-GW 512, the AGW/ATGW 530 and one of the selected TrGW 594, 596 of the interconnection nodes 586, 588 and is indicated in FIG. 5 by a dashed line.

Referring to FIG. 6, the method will be explained in more detail. In a first step L1, the P-CSCF 514 receives a SIP-INVITE message from the calling party 502. The P-CSCF 514 first determines whether the serving communication network 504 supports session routing via the serving communication network 504, and includes routing information identifying the V-CSCF 582 into the SIP-INVITE message based on the knowledge that the serving communication network 504 supports session routing via the serving communication network 504. Here, the routing information corresponds to an address of the V-CSCF 580. Including the routing information into the SIP-message is accomplished by placing the URI of the V-CSCF 580 in a field of a new routing header of the SIP-INVITE message. Thus, the V-CSCF 580 is identified as one of next destinations of the SIP-INVITE message in the session routing path of the signaling data 506. The SIP-INVITE message is then forwarded to the home communication network 508 along the session routing path of the signaling data 506. Alternatively or additionally, the P-CSCF 514 includes a newly registered media feature tag into a routing header of the SIP-INVITE message together with the URI of the V-CSCF 585. The two routing headers may be different from one another or may be identical to one another. The feature tag identifies the V-CSCF 582 to be part of the session routing path of the signaling data 506. For example, the media tag feature may be defined in accordance with www://tools.ieft.org/html/draft-holmberg-sipcore-proxy-feature-00 available at the filing date of the present application.

The SIP-INVITE message is sent from the P-CSCF 514 to the S-CSCF 520 via the IBCFs 516, 518 which process the SIP-INVITE message in a conventional manner and, if enabled by the serving and home communication networks 504, 508, in accordance with 3GPP Optimal Media Routing (OMR) procedures in a step L2. Accordingly, the media data 510 of the session are enabled to be routed along its session routing path directly between the serving communication network 504 of the calling party 502 and the serving communication network of the called party (which is either a home communication network or a visited communication network of the called party).

In a step L3, the S-CSCF 520 receives the SIP-INVITE message and invokes all IMS applications in the TSS/SCC AS 522 in a conventional manner. To this end, respective SIP messages, for example requests and acknowledgments, are exchanged between the two nodes 520, 522.

In a step L4, the S-CSCF 520, being enabled to support session routing via the serving communication network 504, examines the routing information of the SIP-INVITE message received from the P-CSCF 514 and determines whether the routing information of the V-CSCF 580 is present in the SIP-INVITE message. To this end, the S-CSCF 520 determines whether the new routing header (comprising the URI) and/or the feature tag are present. If this determination is not in the affirmative, the session is routed via the home communication network 508 to the called party, and the method stops.

If the determination is in the affirmative, i.e. the routing information is present in the SIP-INVITE message, the S-CSCF 520 further determines whether the SIP-INVITE message is in accordance with a local policy of the home communication network 508. For example, such a local policy of the home communication network 508 may be the capability of the home communication network 508 to receive a SIP-INVITE message from this particular serving communication network 504 or to route a session received from this particular serving communication network 504 to the called party. If the latter determination is not in the affirmative, the signaling data 506 of the session are routed to the called party via the home communication network 508, and the method stops.

If the determination is in the affirmative, the S-CSCF 520 further determines whether the signaling data 506 of the session are to be routed to the called party via the serving communication network 504 of the calling party 502 based on an address of the called party. To this end, the S-CSCF 520 determines whether the home communication network 504 of the called party is distinct from the home communication network 508 of the calling party 502 by means of phone number analysis of the called party. This determination serves to find an optimal session routing path of the signaling data 506 for the case that the called party is in the home communication network 508 of the calling party 502. If the latter determination is not in the affirmative, the signaling data 506 of the session are routed to the called party via the home communication network 508, and the method stops.

If the determination is in the affirmative, the S-CSCF 520 determines whether media routing nodes between the session routing node 598 of the home communication network 508 of the calling party 502 (i.e. a point of determination of the media routing path) and the serving communication network 504 of the calling party are allowed to be bypassed when selecting the session routing path of the media data 510 of the session by examining information in the SIP-INVITE message defined in accordance with a Session Description Protocol (SDP). Here, the media routing nodes of the home communication network 508 and of further communication networks between the home communication network 508 and the serving communication network 504 to be allowed to be bypassed are, for example, specified by roaming interconnection agreements between operators of the respective communication networks. If the latter determination is not in the affirmative, the signaling data 506 of the session are routed to the called party via the home communication network 508 of the calling party 502, and the method stops. Further, the media data 510 are routed along a determined session path of the signaling data 506.

If the determination is in the affirmative, the S-CSCF 520 further determines the Request URI of the SIP-INVITE message, and determines whether the URI of the Request URI is suitable for routing the session towards the serving communication network 504 of the calling party 502. Here, the request URI specifies the next destination of the SIP-INVITE message, and the URI of the new routing header specifies an overall destination of the SIP-INVITE message. If the latter determination is not in the affirmative, the signaling data 506 of the session are routed to the called party via the home communication network 508, and the method stops.

If the determination is in the affirmative, the S-CSCF 520 determines whether the signaling data of the session are to be routed to the called party via the serving communication network 504 of the calling party 502 based on a requested communication service associated with the session. To this end, the S-CSCF 520 determines the kind of the requested communication service (for example, transferring voice data), determines whether the requested communication service is allowed to be routed to the called party via the serving communication network 504 of the calling party 502. If the determination is not in the affirmative, i.e. the requested service is not to be allowed to be routed via the serving communication network 504 of the calling party 502, the signaling data are routed to the called party via the home communication network 508 of the calling party 502, and the method stops. This determination may overrule all previously executed affirmative determination steps.

If the latter determination is in the affirmative, the S-CSCF 520 modifies in a step L5 the URI of the Request URI and the field of the new routing header of the SIP-INVITE message by swapping the information of the Request URI and the new routing header such that the URI of the S-CSCF 520 in the Request URI is replaced by the URI of the V-CSCF 580, and the URI of the called party is placed in the new routing header. Additionally or alternatively to the new routing header in the SIP-INVITE message, a routing path-called party identification-header (P-called party-ID-header) comprising the routing information of the called party is included in the SIP-INVITE message similarly to the usage of the routing header by the originating S-CSCF 520, in order to convey the original URI of the called party to a terminating P-CSCF.

In a next step L6, the ingress IBCF 516 directly routes the SIP-INVITE message to the V-CSCF 582 by using conventional Public Service Identity (PSI) addressing.

In a step L7, the V-CSCF 580, upon receiving the SIP-INVITE message, identifies the called party by analyzing the field of the new routing header and/or the routing path-called party ID-header of the received SIP-INVITE message. If the Request URI of the called party comprises a phone number, the V-CSCF 580 performs ENUM and NP lookups, in order to determine the name and/or the home network of the called party of the session, as the S-CSCF 520 is conventionally able to do. Further, the V-CSCF 580 includes the URI of the called party in the Request URI of the SIP-INVITE message to be sent towards the called party. The V-CSCF 582 also executes local services for the calling party 502, for example including a waiting music. These services are in general generic for all users belonging to an operator of the serving communication network 504, for example based on roaming agreements. The execution of the services may be executed prior or subsequent to the execution of the lookup(s). Afterwards, the V-CSCF 582 determines whether the serving communication network of the called party is identical to the serving communication network 508 of the calling party 502. If the determination is in the affirmative, the V-CSCF 580 determines that the session is to be terminated in the serving communication network 504 and accordingly selects a session control node of the serving communication network 504 (for example, an I-CSCF) for the routing of the session to the called party. If the determination is not in the affirmative, the V-CSCF 580 then determines an interconnection node 586, 588 based on the session characteristics (for example, a CS voice call), and includes routing information of the selected interconnection node 586, 588 in the SIP-INVITE message to be sent.

In a next step L8, the SIP-INVITE message is sent further to a further network node 699, for example a x-CSCF (the I-CSCF and optionally the S-CSCF), a MGCF, or a IBCF of the serving communication network 504 of the calling party 102. The IBCF 699 may be identical to the IBCF 590 or 592 of the network interconnection nodes 585 and 588, respectively. In the case in which the called party resides in the serving communication network 504 of the calling party 502 which is identical to the home communication network of the called party, the SIP-INVITE message is sent to the I-CSCF 699 or to the I-CSCF and S-CSCF 699, in the case of breaking out the call to a CS communication network, the SIP-INVITE message is sent to the MGCF 699, and in the case of routing the signaling data 506 to another IMS based communication network of the calling party, the SIP-INVITE message is sent to the IBCF 699.

In a step L9, SIP-200OK messages including SDP information regarding a generation of an optimized session routing path of the media data 510 are sent to respective nodes in the media session path. Accordingly, media routing nodes between the home communication network 508 and the serving communication network 504 of the calling party 502 are bypassed, and further media routing optimizations may take place.

In a step L10, the V-CSCF 580 includes the field of the new routing header in the SIP-200OK message, in order to inform any node or network between the home communication network 508 and the serving communication network 504 of the calling party 502 about the fact that routing the signaling data 506 of the session via the serving communication network 504 has been established, and that this session routing path of the signaling data 506 is only used for roaming service control purposes. Further, the new routing header is removed by the P-CSCF 514 upon receiving the SIP-200OK message.

In particular, at least one of rules of the determination steps described with respect to FIGS. 2 to 6 may be defined vice versa. For example, instead of determining an identity between two objects, distinctiveness between the two objects may be determined.

Figure 7:
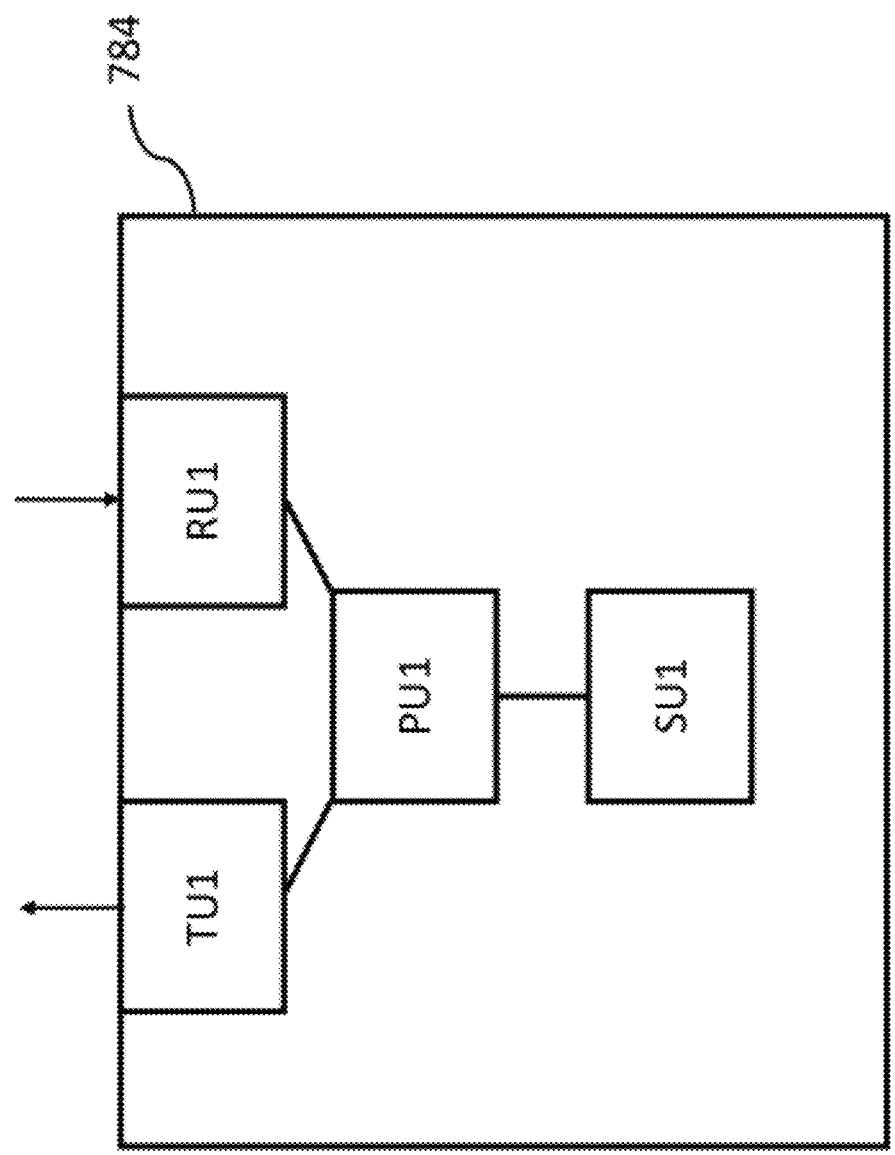
FIGS. 7 and 8 are block diagrams illustrating session routing nodes for routing a session from the calling party in the serving communication network of the calling party to a called party according to exemplary embodiments of the invention.

Referring to FIG. 7, a session routing node 784 in the serving communication network of the calling party will be explained. The session routing node 784 is configured for routing a session from the calling party in the serving communication network of the calling party to a called party. The serving communication network of the calling party is distinct from a home communication network of the calling party. The session routing node 784 comprises a receiving unit RU1 configured for receiving a session routing request from the home communication network of the calling party requesting routing signaling data of the session to the called party via the serving communication network of the calling party, and a routing unit TU1 configured for routing the signaling data of the session to the called party via the serving communication network of the calling party based on the received session routing request. The routing unit TU1 may be identical or may from part of a sending unit of the session routing node 784. The session routing node 784 may further comprise a processing unit PU1 configured for processing information related to a method of routing a session from the calling party in the serving communication network of the calling party to a called party. In particular, the processing unit PU1 may be configured for executing respective method steps of the method as explained above. Further, the session routing node 784 may comprise a storage unit SU1 configured for storing information related to the method. In particular, at least two of the units may be integrally formed. In particular, the session routing node 784 may be configured for executing the method of routing a session from the calling party in the serving communication network of the calling party to a called party as described above.

Next, further exemplary embodiments of the session routing node 784 will be explained. However, these embodiments also apply to the respective methods, the respective session routing node in the home communication system of the calling party, the respective communication system, the respective computer program, and the respective computer-readable medium as described in the "Summary" section and the "Detailed description" section.

The session routing node 784 may be configured as a Visited-Call Session Control Function (V-CSCF) node.

Further, the session routing node 784 may be co-located with at least one of a Proxy Call Session Control Function (P-CSCF) node and an Access Transfer Control Function (ATCF) node (particularly of the serving communication network of the calling party), particularly in a case and/or if the P-CSCF and/or ATCF may be co-located with a Serving-Call Session Control Function (S-CSCF) of the serving communication network of the calling party.

Figure 8:
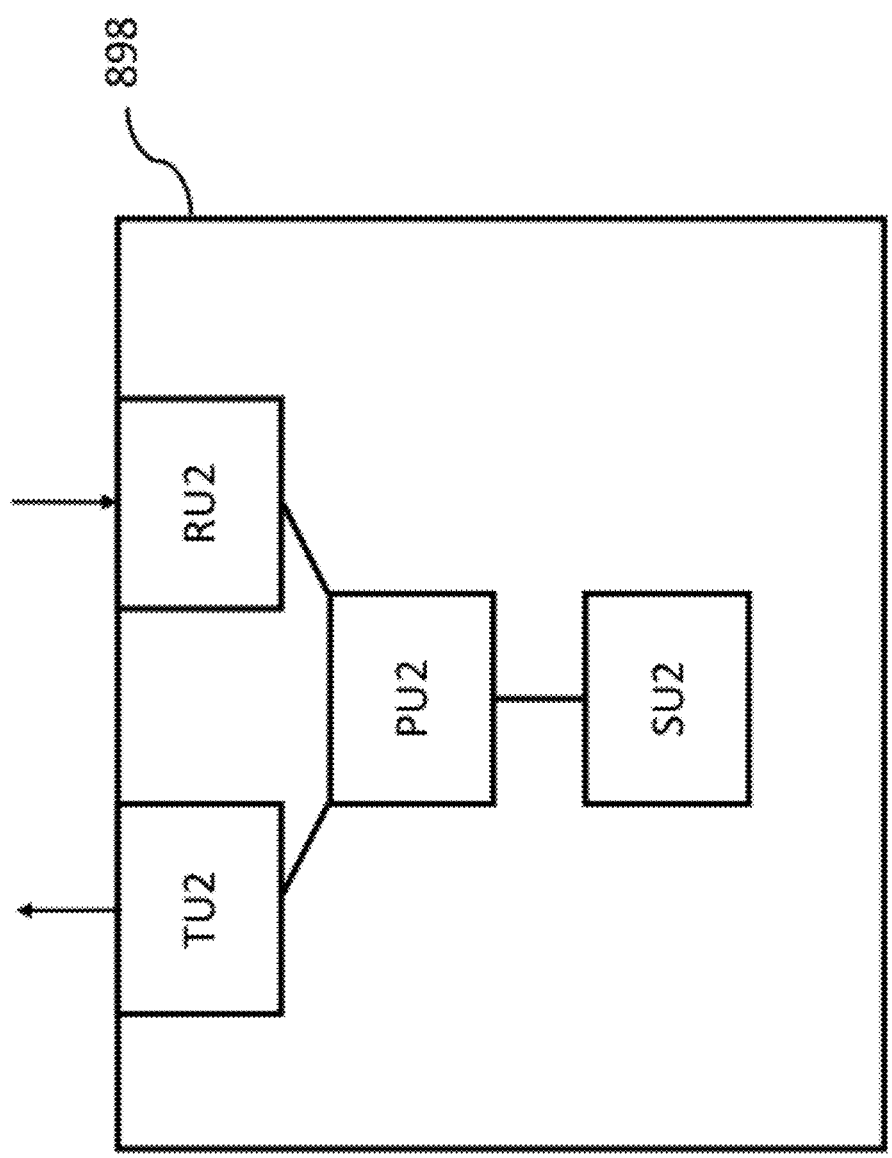

Referring to FIG. 8, a session routing node 898 in a home communication network of a calling party will be explained. The session routing node 898 is configured for routing a session from the calling party in the serving communication network of the calling party to a called party. The serving communication network of the calling party is distinct from a home communication network of the calling party. The session routing node 898 comprises a receiving unit RU2 configured for receiving from the serving communication network of the calling party a session routing request requesting routing signaling data of the session to the called party via the serving communication network of the calling party, and a determining unit PU1 configured for determining whether the signaling data of the session are to be routed via the serving communication network of the calling party. In particular, the determining unit PU2 may form part or may be identical to a processing unit of the session routing node 898. In particular, the processing unit PU2 may be configured for processing information related to a method of routing a session from the calling party in the serving communication network of the calling party to a called party, and may be configured for executing respective determination steps of the method as explained above. The session routing node 898 comprises a routing unit TU2 configured for routing the signaling data of the session to the serving communication network of the calling party based on a result of the determination. In particular, the routing unit TU2 may be identical or may form part of a sending unit of the session routing node 898 which may be configured for sending information. In particular, the session routing node 898 may comprise a storage unit SU2 configured for storing information relating to a method of routing a session from a calling party in a serving communication network of the calling party to a called party. In particular, at least two of the units may be integrally formed. In particular, the session routing node 898 may be configured for executing the method of routing a session from the calling party in the serving communication network of the calling party to a called party as described above.

Next, further exemplary embodiments of the session routing node 898 will be explained. However, these embodiments also apply to the respective methods, the respective session routing node in the serving communication system of the calling party, the respective communication system, the respective computer program, and the respective computer-readable medium as described in the "Summary" section and the "Detailed description" section.

The session routing node 898 may be configured as a Serving-Call Session Control Function (S-CSCF) node.

In the following, another session routing node on the serving communication network for routing a session from a calling party in a serving communication network of the calling party to a called party will be explained. The serving communication network of the calling party is distinct from a home communication network of the calling party. The another session routing node comprises a sending unit configured for sending to (particularly the session routing node 782 of) the home communication network of the calling party a session routing request requesting routing signaling data of the session to the called party via the serving communication network of the calling party. The another session routing node comprises a routing unit configured for routing signaling data of the session to the home communication network of the calling party. In particular, the routing unit may form part or may be identical to a sending unit of the another session routing node which may be configured for sending information. In particular, the another session routing node comprises a receiving unit configured for receiving information, a processing unit configured for processing information, and a storage unit configured for storing information related to a method of routing a session from the calling party in the serving communication network of the calling party to a called party. In particular, at least two of the units may be integrally formed.

In particular, the another session routing node is configured for including routing information identifying the session routing node 798 in the session routing request.

In particular, the another session routing node is configured as a Proxy-Call Session Control Function (P-CSCF) node.

In the following, a communication system for routing a session from a calling party in a serving communication network of the calling party to a called party will be explained. The serving communication network of the calling party is distinct from a home communication network of the calling party. The communication system comprises a session routing node 782 and a session routing node 898 as described above. The communication system may further comprise the another session routing node as described above.

In the following, a program element according to an exemplary embodiment will be described. The program element, when being executed by a processor or processing unit particularly of the session routing node 784, 898 or the another session routing node, is configured to carry out or control a method of routing a session from a calling party in a serving communication network of the calling party to a called party as described above.

In the following, a computer-readable medium according to an exemplary embodiment will be described. In the computer-readable medium, a computer program for routing a session of a calling party in a serving communication network of the calling party to a called party is stored. The computer program, when being executed by a processor or processing unit particularly of the session routing node 784, 898 or the another session routing node, is configured to carry out or control a method of routing a session from a calling party in a serving communication network of the calling party to a called party as described above. The computer readable medium may be configured, for example, as volatile memory, non-volatile memory, a CD, a DVD, a USB stick, a floppy disk or a hard disk.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the use of indefinite articles "a" or "an" does not exclude a plurality. The mere fact that certain measures are recited in mutually different dependent claims does not indicate that a combination of these measures cannot be used to advantage. Any reference signs in the claims should not be construed as limiting the scope.

What is claimed is:

1. A method implemented by a session routing node in a serving communication network of a calling party for routing signaling data for establishment of a session from the calling party to a called party, wherein the method comprises:
   receiving from a session routing node in a home communication network of the calling party a session routing request requesting routing the signaling data to the called party via the serving communication network of the calling party, the session routing request comprising routing information identifying the session routing node in the serving communication network of the calling party and identifying the called party, wherein the serving communication network of the calling party is distinct from the home communication network of the calling party,
   analyzing the session routing request for determining the called party,
   based on a result of said analyzing and at the session routing node in the serving communication network of the calling party, deciding a communication network to which the signaling data is to be routed, and routing the signaling data to the called party via the serving communication network of the calling party based on the received session routing request and based on a result of said deciding.

2. The method according to claim 1, further comprising determining at the session routing node in the serving communication network of the calling party whether a home communication network of the called party is identical to the serving communication network of the calling party, and wherein, if the home communication network of the called party is identical to the serving communication network of the calling party, said deciding comprises deciding that the signaling data is to be routed to the serving communication network of the calling party and that such routing has already occurred, and said routing comprises routing the signaling data to the called party within the serving communication network of the calling.

3. The method according to claim 1, wherein the serving communication network of the calling party is distinct from a serving communication network of the called party, and wherein the method further comprises determining a network interconnection node in the serving communication network of the calling party based on session characteristics, and wherein said routing comprises routing the signaling data towards the serving communication network of the called party via the network interconnection node in the serving communication network of the calling party based on a result of the determination.

4. The method according to claim 3, wherein the session comprises media data, and wherein said routing comprises routing the media data to the called party via the network interconnection node.

5. The method according to claim 1, further comprising executing for the calling party a service associated with a session routing node in the home communication network of the calling party.

6. The method according to claim 1, wherein the serving communication network of the calling party is distinct from a serving communication network of the called party, and wherein said routing comprises, responsive to receiving the session routing request, routing the signaling data directly from the serving communication network of the calling party to the serving communication network of the called party.

7. A method implemented by a session routing node in a home communication network of a calling party for routing signaling data for establishment of a session from the calling party to a called party, the calling party served by a serving communication network that is distinct from said home communication network, wherein the method comprises:
receiving from the serving communication network of the calling party a first session routing request requesting routing the signaling data to the called party via the serving communication network of the calling party, the first session routing request comprising routing information identifying a session routing node in the serving communication network of the calling party,
determining whether the signaling data are to be routed via the serving communication network of the calling party, and
routing the signaling data in a second session routing request to the session routing node in the serving communication network of the calling party based on the received first session routing request and a result of the determination, the second session routing request requesting routing the signaling data to the called party via the serving communication network of the calling party and comprising routing information that identifies the session routing node in the serving communication network of the calling party and that identifies the called party.

8. The method according to claim 7, wherein said determining comprises determining whether the first session routing request comprises routing information identifying said session routing node in the serving communication network of the calling party, and wherein said routing comprises routing the signaling data to the serving communication network of the calling party if the first session routing request comprises such routing information.

9. The method according to claim 8, wherein the routing information comprises at least one of a Uniform Resource Identifier, and feature information of a message header.

10. The method according to claim 7, wherein said determining comprises determining whether the first session routing request is in accordance with an available policy of the home communication network of the calling party, and wherein said routing comprises routing the signaling data to the serving communication network of the calling party if the first session routing request is in accordance with the available policy.

11. The method according to claim 7, wherein said determining is based on an address of the called party.

12. The method according to claim 7, wherein said determining comprises determining whether media routing nodes between said session routing node in the home communication network of the calling party and the serving communication network of the calling party are allowed to be bypassed in the session, and wherein said routing comprises routing the signaling data to the serving communication network of the calling party if the media routing nodes between the session routing node in the home communication network of the calling party and the serving communication network of the calling party are allowed to be bypassed in the session.

13. The method according to claim 7, wherein said determining is based on a requested communication service associated with the session.

14. The method according to claim 7, wherein the serving communication network of the calling party is distinct from a serving communication network of the called party, and wherein the second session routing request requests routing the signaling data directly from the serving communication network of the calling party to the serving communication network of the called party.

15. The method according to claim 7, further comprising delegating to the session routing node in the serving communication network of the calling party an execution of a service for the calling party, said service associated with the session routing node of the home communication network of the calling party.

16. A method of routing a session from a calling party to a called party, the method comprising:
transferring a session routing request between a home communication network of the calling party and a serving communication network of the calling party, the session routing request requesting routing signaling data of the session to the called party via the serving communication network of the calling party, the session routing request comprising routing information identifying the called party and identifying a session routing node in the serving communication network of the calling party that is configured to decide, based on a result of analyzing the session routing request for determining the called party, a communication network to which the signaling data is to be routed, wherein the serving communication network of the calling party is distinct from the home communication network of the calling party, and
routing the signaling data of the session to the called party via the serving communication network of the calling party based on the transferred session routing request.

17. A session routing node in a serving communication network of a calling party for routing signaling data for establishment of a session from the calling party to a called party, the session routing node comprising:
a receiving circuit configured to receive a session routing request from a session routing node in a home communication network of the calling party, the session routing request requesting routing the signaling data to the called party via the serving communication network of the calling party, the session routing request comprising routing information identifying the session routing node in the serving communication network of the calling party and identifying the called party, wherein the serving communication network of the calling party is distinct from the home communication network of the calling party,
an analyzing circuit configured to analyze the session routing request for determining the called party, and
a routing circuit configured to, based on a result of said analysis, decide a communication network to which the signaling data is to be routed, and to route the signaling data to the called party via the serving communication network of the calling party based on the received session routing request and based on a result of said decision.

18. The session routing node according to claim 17, wherein the session routing node in the serving communication network of the calling party is configured as a Visited-Call Session Control Function node.

19. The session routing node according to claim 17, wherein the session routing node is co-located with at least one of a Proxy-Call Session Control Function node and an Access Transfer Control Function node.

20. A session routing node in a home communication network of a calling party for routing signaling data for establishment of a session from the calling party to a called party, the calling party served by a serving communication network that is distinct from the home communication network, the session routing node comprising:
a receiving circuit configured to receive from the serving communication network of the calling party a first session routing request requesting routing the signaling data to the called party via the serving communication network of the calling party, the first session routing request comprising routing information identifying a session routing node in the serving communication network of the calling party,
a determining circuit configured to determine whether the signaling data are to be routed via the serving communication network of the calling party, and
a routing circuit configured to route the signaling data in a second session routing request to the serving communication network of the calling party based on the received first session routing request and a result of the determination, the second session routing request requesting routing the signaling data to the called party via the serving communication network of the calling party and comprising routing information that identifies the session routing node in the serving communication network of the calling party and that identifies the called party.

21. The session routing node according to claim 20, wherein the session routing node is configured as a Serving-Call Session Control Function node.

22. A communication system for routing signaling data for establishment of a session from a calling party to a called party, the communication system comprising:
a session routing node in a serving communication network of the calling party, wherein the serving communication network of the calling party is distinct from a home communication network of the calling party, and
a session routing node in the home communication network of the calling party,
wherein the session routing node in the home communication network of the calling party comprises:
a receiving circuit configured to receive from the serving communication network of the calling party a first session routing request requesting routing the signaling data to the called party via the serving communication network of the calling party, the first session routing request comprising routing information identifying the session routing node in the serving communication network of the calling party,
a determining circuit configured to determine whether the signaling data are to be routed via the serving communication network of the calling party, and
a routing circuit configured to route the signaling data in a second session routing request to the serving communication network of the calling party based on the received first session routing request and a result of the determination, the second session routing request requesting routing the signaling data to the called party via the serving communication network of the calling party and comprising routing information that identifies the session routing node in the serving communication network of the calling party and that identifies the called party, and
wherein the session routing node in the serving communication network of the calling party comprises:
a receiving circuit configured to receive the second session routing request from the session routing node in the home communication network of the calling party,
an analyzing circuit configured to analyze the second session routing request for determining the called party, and
a routing circuit configured to, based on a result of said analysis, decide to which communication network the signaling data is to be routed, and to route the signaling data to the called party via the serving communication network of the calling party based on the received second session routing request and based on a result of said decision.

23. A computer program product stored on a non-transitory computer-readable medium and comprising computer program code that, when executed by a processor associated with a session routing node in a serving communication network of a calling party, causes the session routing node to route signaling data for establishment of a session from the calling party to a called party, wherein the computer program code causes the session routing node to:
receive from a session routing node in a home communication network of the calling party a session routing request requesting routing the signaling data to the called party via the serving communication network of the calling party, the session routing request comprising routing information identifying the session routing node in the serving communication network of the calling party and identifying the called party, wherein the serving communication network of the calling party is distinct from the home communication network of the calling party, analyze the session routing request for determining the called party, based on a result of said analysis, decide to which communication network the signaling data is to be routed, and route the signaling data to the called party via the serving communication network of the calling party based on the received session routing request and based on a result of said decision.

24. A computer program product stored on a non-transitory computer-readable medium and comprising computer program code that, when executed by a processor associated with a session routing node in a home communication network of a calling party, causes the session routing node to route signaling data for establishment of a session from the calling party to a called party, wherein the calling party is served by a serving communication network that is distinct from the home communication network of the calling party, and wherein the computer program code causes the session routing node to:

receive from the serving communication network of the calling party a first session routing request requesting routing the signaling data to the called party via the serving communication network of the calling party, the first session routing request comprising routing information identifying a session routing node in the serving communication network of the calling party, determine whether the signaling data are to be routed via the serving communication network of the calling party, and route the signaling data in a second session routing request to the session routing node in the serving communication network of the calling party based on the received first session routing request and a result of the determination, the second session routing request requesting routing the signaling data to the called party via the serving communication network of the calling party and comprising routing information that identifies the session routing node in the serving communication network of the calling party and that identifies the called party.

25. The method according to claim 1, wherein routing the signaling data to the called party via the serving communication network of the calling party comprises routing the signaling data to the called party through the serving communication network of the calling party.

26. The method according to claim 1, further comprising determining whether a home communication network of the called party is identical to the serving communication network of the calling party, and wherein, if the home communication network of the called party is not identical to the serving communication network of the calling party, said deciding comprises deciding that the signaling data is to be routed to a communication network different than the serving communication network of the calling party and said routing comprises routing the signaling data through the serving communication network of the calling party to said different communication network.

27. The method according to claim 16, wherein routing the signaling data to the called party via the serving communication network of the calling party comprises routing the signaling data to the called party through the serving communication network of the calling party.

28. The method according to claim 7, wherein the session routing node in the serving communication network of the calling party is configured to decide to which communication network the signaling data is to be routed.

29. The session routing node according to claim 20, wherein the session routing node in the serving communication network of the calling party is configured to decide to which communication network the signaling data is to be routed.

* * * * *

UNITED STATES PATENT AND TRADEMARK OFFICE
CERTIFICATE OF CORRECTION

PATENT NO. : 8,964,961 B2  
APPLICATION NO. : 13/012337  
DATED : February 24, 2015  
INVENTOR(S) : Keller et al.

It is certified that error appears in the above-identified patent and that said Letters Patent is hereby corrected as shown below:

On the title page item 75

Under "Inventors", in Column 1, Line 1, delete "Wurselen (DE);" and insert -- Würselen (DE); --, therefor.

Under "Inventors", in Column 1, Line 2, delete "Alvsjo (SE);" and insert -- Älvsjö (SE); --, therefor.

Under "Inventors", in Column 1, Line 3, delete "Jarfalla (SE);" and insert -- Järfälla (SE); --, therefor.

In the drawings

In Fig. 3, Sheet 3 of 8, for Tag "360", in Line 2, delete "data f" and insert -- data of --, therefor.

In the specification

In Column 2, Lines 40-41, delete "communication network 102," and insert -- communication network 104, --, therefor.

In Column 15, Line 26, delete "TSS/SCC AS" and insert -- TAS/SCC AS --, therefor.

In Column 15, Line 60, delete "network 504" and insert -- network 508 --, therefor.

In Column 17, Line 23, delete "network 508" and insert -- network 504 --, therefor.

In the claims

In Column 21, Line 17, in Claim 2, delete "calling." and insert -- calling party. --, therefor.

Signed and Sealed this  
Twenty-third Day of February, 2016

Michelle K. Lee  
*Director of the United States Patent and Trademark Office*